United States Patent
Li et al.

(10) Patent No.: US 9,853,845 B2
(45) Date of Patent: Dec. 26, 2017

(54) APPARATUS, METHOD, AND COMPUTER READABLE MEDIA FOR INDICATING A COMMUNICATION PROTOCOL AND INFORMATION IN A SIGNAL FIELD

(71) Applicant: Intel IP Corporation, Santa Clara, CA (US)

(72) Inventors: Qinghua Li, San Ramon, CA (US);
Xiaogang Chen, Beijing (CN);
Huaning Niu, Milpitas, CA (US);
Robert J. Stacey, Portland, OR (US);
Jeongho Jeon, San Jose, CA (US);
Yuan Zhu, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 101 days.

(21) Appl. No.: 14/744,091

(22) Filed: Jun. 19, 2015

(65) Prior Publication Data
US 2016/0227537 A1     Aug. 4, 2016

Related U.S. Application Data

(60) Provisional application No. 62/111,385, filed on Feb. 3, 2015.

(51) Int. Cl.
*H04W 72/04* (2009.01)
*H04L 27/20* (2006.01)
(Continued)

(52) U.S. Cl.
CPC ............... *H04L 27/20* (2013.01); *H04L 5/00* (2013.01); *H04L 27/2613* (2013.01); *H04W 84/12* (2013.01)

(58) Field of Classification Search
CPC .................................... H04W 72/0453
(Continued)

(56) References Cited

U.S. PATENT DOCUMENTS

| 2006/0120269 A1* | 6/2006 | Kim ............. H04L 25/03866 370/208 |
| 2009/0103639 A1* | 4/2009 | Sankabathula ..... H04L 27/2618 375/260 |

(Continued)

FOREIGN PATENT DOCUMENTS

| WO | WO-2014171788 A1 | 10/2014 |
| WO | WO-2015003119 A1 | 1/2015 |

(Continued)

OTHER PUBLICATIONS

"International Application Serial No. PCT/US2016/012966, International Search Report dated May 31, 2016", 3 pgs.

(Continued)

*Primary Examiner* — Charles C Jiang
*Assistant Examiner* — Wali Butt
(74) *Attorney, Agent, or Firm* — Schwegman Lundberg & Woessner, P.A.

(57) ABSTRACT

Apparatuses, methods, and computer readable media for indicating a communication and information in a signal field are disclosed. A high-efficiency wireless local area network (HEW) device comprises circuitry is disclosed. The circuitry may be configured to: generate a HEW packet comprising a legacy signal (L-SIG) field, where the L-SIG field comprises a plurality of subcarriers, and an R-L-SIG field, where the R-L-SIG field comprises a repeat of the plurality of subcarriers partitioned into a plurality of groups, and where information is encoded into one or more groups of the plurality of groups by a same modulation to each subcarrier partitioned into the corresponding group. A HEW device com- (Continued)

prising circuitry is disclosed. The circuitry may be configured to: receive a L-SIG field; receive a R-L-SIG field; and determine whether the R-L-SIG field is a repeat of the L-SIG field with piggybacked information.

25 Claims, 6 Drawing Sheets

(51) Int. Cl.
  *H04L 27/26* (2006.01)
  *H04L 5/00* (2006.01)
  *H04W 84/12* (2009.01)

(58) Field of Classification Search
  USPC .................. 370/329, 338; 455/509; 375/295; 714/807
  See application file for complete search history.

(56) References Cited

U.S. PATENT DOCUMENTS

| | | | |
|---|---|---|---|
| 2011/0255620 A1* | 10/2011 | Jones, IV | H04L 5/0046 375/260 |
| 2012/0177144 A1 | 7/2012 | Lee et al. | |
| 2014/0211775 A1 | 7/2014 | Sampath et al. | |
| 2015/0009894 A1* | 1/2015 | Vermani | H04L 1/0072 370/328 |
| 2015/0146653 A1* | 5/2015 | Zhang | H04L 5/0041 370/329 |
| 2015/0173070 A1* | 6/2015 | Aboul-Magd | H04L 5/0007 370/329 |

FOREIGN PATENT DOCUMENTS

| WO | WO-2015009846 A1 | 1/2015 |
|---|---|---|
| WO | WO-2016126389 A1 | 8/2016 |

OTHER PUBLICATIONS

"International Application Serial No. PCT/US2016/012966, Written Opinion dated May 31, 2016", 4 pgs.

"International Application Serial No. PCT/US2016/012966, International Preliminary Report on Patentability dated Aug. 17, 2017", 6 pgs.

* cited by examiner

APPARATUS, METHOD, AND COMPUTER READABLE MEDIA FOR INDICATING A COMMUNICATION PROTOCOL AND INFORMATION IN A SIGNAL FIELD

PRIORITY CLAIM

This application claims the benefit of priority under 35 USC 119(e) to U.S. Provisional Patent Application Ser. No. 62/111,385, filed Feb. 3, 2015, which is incorporated herein by reference in the entirety.

TECHNICAL FIELD

Embodiments pertain to wireless networks. Some embodiments relate to wireless local area networks (WLANs) including networks operating in accordance with Institute Electrical and Electronic Engineers (IEEE) 802.11ax. Some embodiments relate to indicating the protocol version of a packet. Some embodiments relate to a legacy signal field being repeated to indicate a protocol of the packet and to piggybacking additional bits with the repeated legacy signal field.

BACKGROUND

One issue in wireless local area networks (WLANs) is identifying the communication protocol of a packet. The wireless network may support different protocols including legacy protocols and the receiver of the packet needs to determine the communication protocol used to transmit the packet. Additionally, users of WLANs continue to request more bandwidth and faster response times.

Thus, there are general needs for systems and methods for efficiently using the wireless medium, and in particularly, to more efficiently indicate the communication protocol of a packet.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
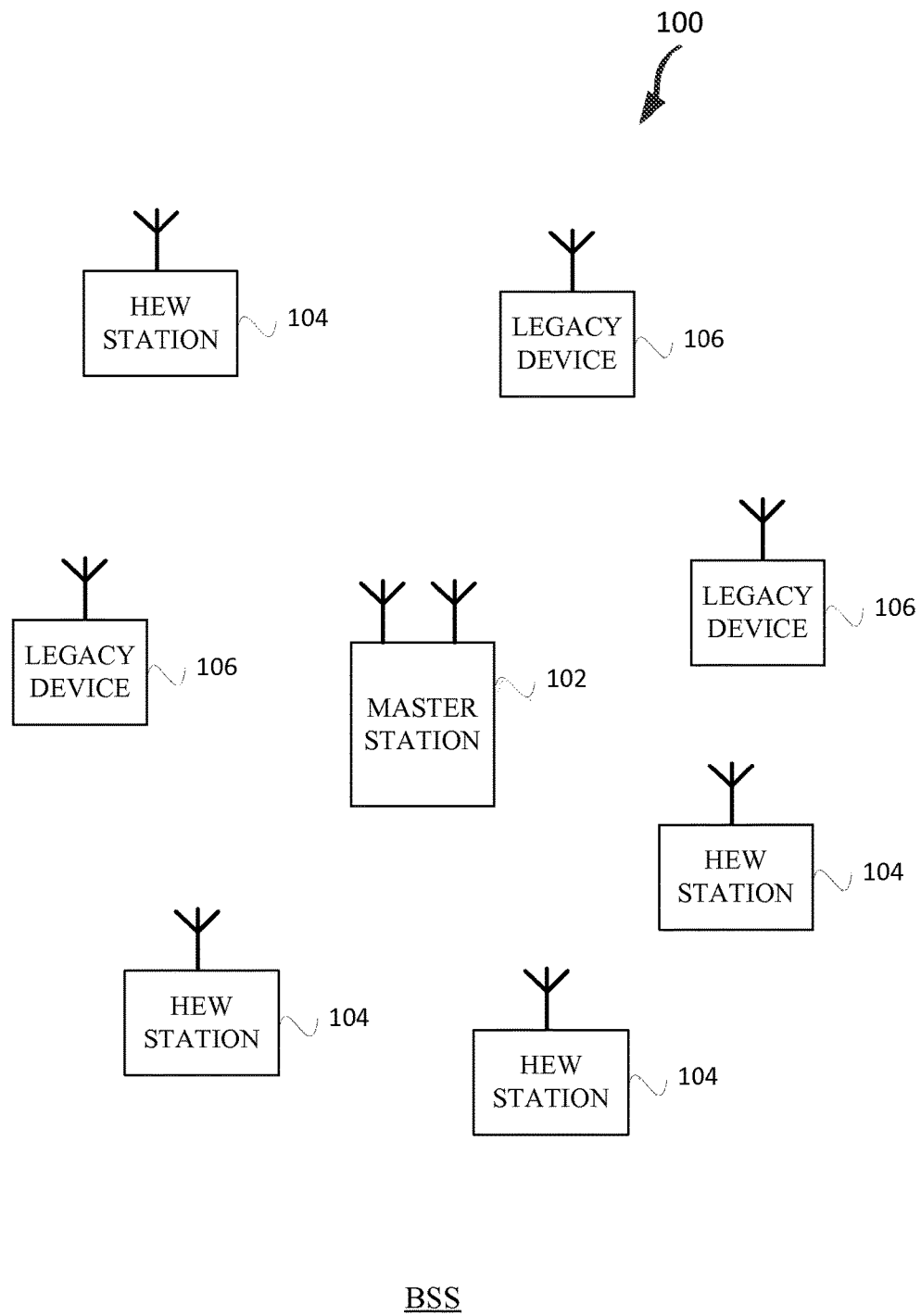
FIG. 1 illustrates a WLAN with some embodiments.

FIG. 1 illustrates a WLAN 100 in accordance with some embodiments. The WLAN may comprise a basis service set (BSS) 100 that may include a master station 102, which may be an AP, a plurality of high-efficiency wireless (HEW) (e.g., IEEE 802.11ax) STAs 104 and a plurality of legacy (e.g., IEEE 802.11n/ac) devices 106.

The master station 102 may be an AP using the IEEE 802.11 to transmit and receive. The master station 102 may be a base station. The master station 102 may use other communications protocols as well as the IEEE 802.11 protocol. The IEEE 802.11 protocol may be IEEE 802.11ax. The IEEE 802.11 protocol may include using OFDMA, time division multiple access (TDMA), and/or code division multiple access (CDMA). The IEEE 802.11 protocol may include a multiple access technique. For example, the IEEE 802.11 protocol may include space-division multiple access (SDMA) and/or MU-MIMO.

The legacy devices 106 may operate in accordance with one or more of IEEE 802.11 a/g/ag/n/ac, IEEE 802.11-2012, or another legacy wireless communication standard. The legacy devices 106 may be STAs or IEEE STAs.

The HEW STAs 104 may be wireless transmit and receive devices such as cellular telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HEW STAs 104 may be termed high efficiency (HE) stations.

The BSS 100 may operate on a primary channel and one or more secondary channels or sub-channels. The BSS 100 may include one or more master stations 102. In accordance with some embodiments, the master station 102 may communicate with one or more of the HEW devices 104 on one or more of the secondary channels or sub-channels or the primary channel. In accordance with some embodiments, the master station 102 communicates with the legacy devices 106 on the primary channel. In accordance with some embodiments, the master station 102 may be configured to communicate concurrently with one or more of the HEW STAs 104 on one or more of the secondary channels and a legacy device 106 utilizing only the primary channel and not utilizing any of the secondary channels.

The master station 102 may communicate with legacy devices 106 in accordance with legacy IEEE 802.11 communication techniques. In example embodiments, the master station 102 may also be configured to communicate with HEW STAs 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth as a sub-channel, and the bandwidth may be one of 20 MHz, 40 MHz, or 80 MHz, 160 MHz, 320 MHz contiguous bandwidths or an 80+80 MHz (160 MHz) non-contiguous bandwidth. In some embodiments, bandwidths of 1 MHz, 1.25 MHz, 2.0 MHz, 2.5 MHz, 5 MHz and 10 MHz, or a combination thereof or another bandwidth that is less or equal to the available bandwidth, may also be used. A HEW frame may be configured for transmitting a number of spatial streams, which may be in accordance with MU-MIMO.

In other embodiments, the master station 102, HEW STA 104, and/or legacy device 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HEW communications. In accordance with some IEEE 802.11ax embodiments, a master station 102 may operate as a master station which may be arranged to contend for a wireless medium (e.g., during a contention period) to receive exclusive control of the medium for an HEW control period. In some embodiments, the HEW control period may be termed a transmission opportunity (TXOP). The master station 102 may transmit a HEW master-sync transmission, which may be a trigger frame or HEW control and schedule transmission, at the beginning of the HEW control period. The master station 102 may transmit a time duration of the TXOP and sub-channel information. During the HEW control period, HEW STAs 104 may communicate with the master station 102 in accordance with a non-contention based multiple access technique such as OFDMA or MU-MIMO. This is unlike conventional WLAN communications in which devices communicate in accordance with a contention-based communication technique, rather than a multiple access technique. During the HEW control period, the master station 102 may communicate with HEW stations 104 using one or more HEW frames. During the HEW control period, the HEW STAs 104 may operate on a sub-channel smaller than the operating range of the master station 102. During the HEW control period, legacy stations refrain from communicating. In accordance with some embodiments, during the master-sync transmission the HEW STAs 104 may contend for the wireless medium with the legacy devices 106 being excluded from contending for the wireless medium during the master-sync transmission.

In some embodiments, the multiple-access technique used during the HEW control period may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The master station 102 may also communicate with legacy stations 106 and/or HEW stations 104 in accordance with legacy IEEE 802.11 communication techniques. In some embodiments, the master station 102 may also be configurable to communicate with HEW stations 104 outside the HEW control period in accordance with legacy IEEE 802.11 communication techniques, although this is not a requirement.

In example embodiments, the HEW station 104 and master station 102 are configured to perform one or more of the functions and/or methods described herein and/or in conjunction with FIGS. 1-6 for generating, transmitting, receiving, interpreting, and operating in accordance with frames that indicate the protocol of the frame using an R-L-SIG field and which may also indicate additional information.

Figure 2:
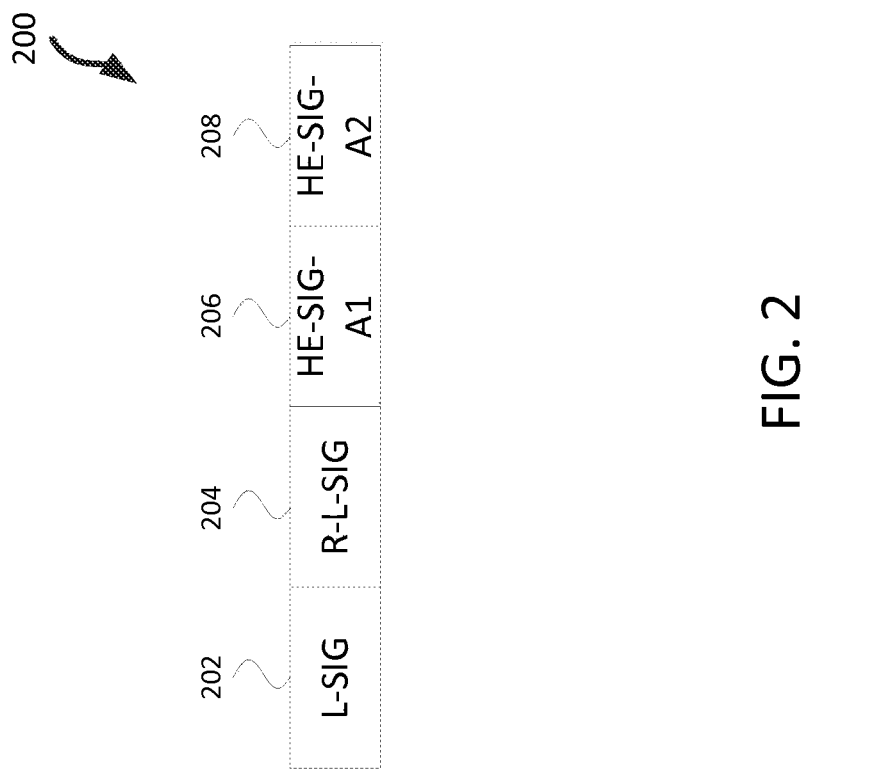
FIG. 2 illustrates a repeated legacy signal field (R-L-SIG) field to indicate an IEEE 802.11ax packet in accordance with some embodiments.

FIG. 2 illustrates a repeated legacy signal field (R-L-SIG) 204 field to indicate an IEEE 802.11ax packet in accordance with some embodiments. Illustrated in FIG. 2 are a packet 200, a legacy signal (L-SIG) 202 field, a R-L-SIG 204 field, a high-efficiency signal A1 (HE-SIG-A1) 206 field, and a high-efficiency signal A2 208 field. HE-SIG-An may indicate the nth symbol of high efficiency IEEE 802.11ax signal field. The L-SIG 202 may be a legacy signal field. The L-SIG 202 may include a rate field, length, and tail field. The L-SIG 202 field may include the physical layer header information. The R-L-SIG 204 field may be a repeat of the L-SIG 202 field. The HEW station 104 and/or HEW master station 102 may be configured to determine that a packet 200 is a HEW packet based on the L-SIG 202 field being repeated as the R-L-SIG 204 field. The HE-SIG-A1 206 field and HE-SIG-A2 208 field may be signal fields for HEW packets that may include information such as a data rate for subsequent data (not illustrated).

In some embodiments it takes 4 microseconds (μs) to transmit the R-L-SIG 204 field. The 4 μs may be a long time for indicating the protocol of the packet 200 is IEEE 802.11ax. In some embodiments, the polarization of the R-L-SIG 204 field may be used for signaling one bit of information in addition to the protocol version IEEE 802.11ax.

Figure 3:
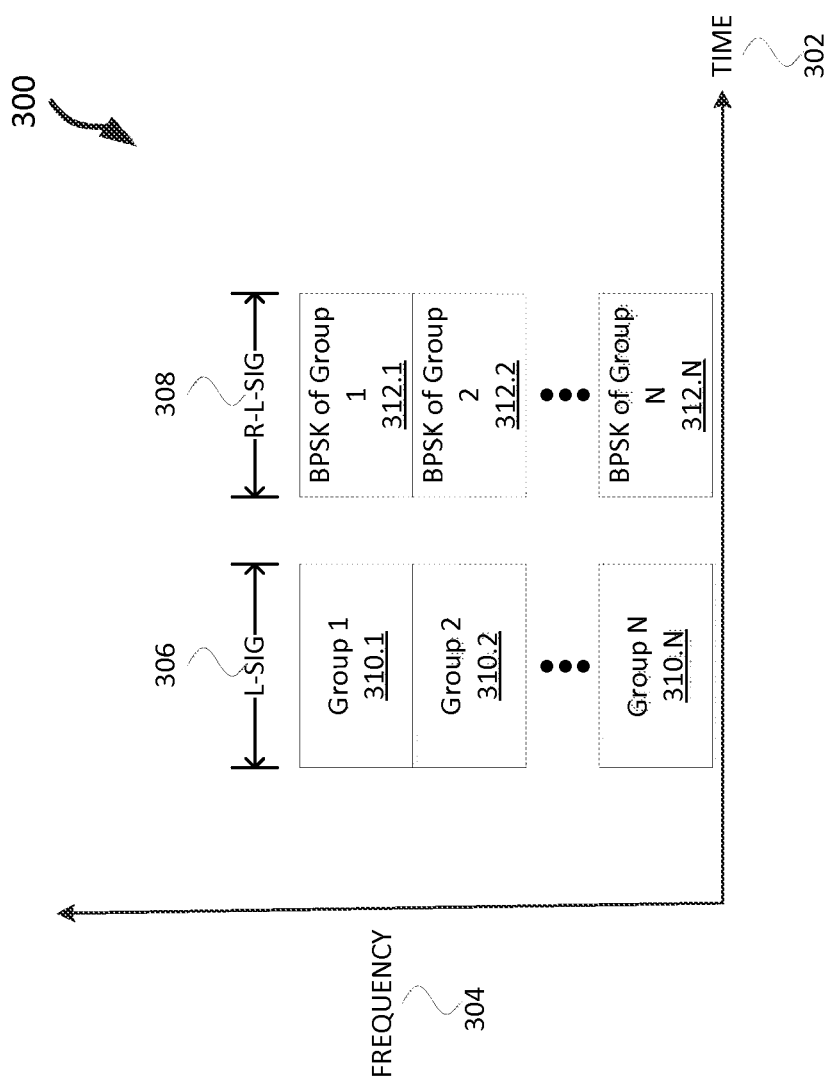
FIG. 3 illustrates an example of sending N piggybacked bits with an R-L-SIG in accordance with some embodiments.

FIG. 3 illustrates an example of sending N piggybacked bits with an R-L-SIG 304 in accordance with some embodiments. Illustrated in FIG. 3 is time 302 along a horizontal axis, frequency 304 along a vertical axis, an L-SIG 306 field, and an R-L-SIG 308 field. The L-SIG 306 field may be a legacy signal field. The R-L-SIG 308 field may be a repetition of the L-SIG 306 field with the polarization of some subcarriers or symbols flipped to encode bits of information. The orthogonal frequency-division multiplexing (OFDM) symbol of the R-L-SIG 308 field may be subcarriers that are the same subcarriers of the OFDM but that are modulated according to the piggybacked bits. The R-L-SIG 308 field may be used to indicate that the packet to follow (not illustrated) is an IEEE 802.11ax packet.

The R-L-SIG 308 field may be one symbol, which may have 48-56 usable subcarriers within a 20 MHz sub-channel. In some embodiments the R-L-SIG 308 field may be transmitted on a different sized sub-channel such as 80, 160, or 320 MHz. The L-SIG 306 field may be partitioned into group 1 310.1, group 2 310.2 through group n 310.n. In some embodiments two to four groups 310 are used with each group having 13-24 subcarriers or symbols. For example, the L-SIG 306 field may be partitioned into three groups with each group having 16 to 19 subcarriers. Each group 310.1, 310.2, 310.N can carry one bit of information using an encoding scheme such as binary phase shift keying (BPSK). In some embodiments the polarization of each symbol or subcarrier of the group 310 is flipped or not flipped to indicate one bit of information. The R-L-SIG 308 field may send one bit of additional information with each group 310 and indicate that the packet is an IEEE 802.11ax packet. For example, R-L-SIG 308 field may include BPSK of group 1 312.1, BPSK of group 2 312.2, through BPSK of group N 312.n. The BPSK of group 1 312.1 is a BPSK encoding of group 1 310.1, BPSK of group 2 312.2 is an encoding of group 2 310.2, and BPSK of group N 312.N is an encoding of group n 310.n.

In some embodiments, after additional bits are detected, the encoding is removed (e.g., BPSK modulation) from the R-L-SIG 308 field and then the similarity between L-SIG 306 field 306 and R-L-SIG 308 field with the encoding removed is determined. If the two are similar enough, the HEW station 104 or master station 102 determines that the R-L-SIG 308 field is a repetition of L-SIG 306 field, and therefore that the communication protocol is IEEE 802.11ax.

The HEW station 104 or master station 102 partitions the subcarriers of the OFDM symbol of the L-SIG 306 field into groups 310. In some embodiments subcarriers that are used as pilots may not be included in a group 310. In some embodiments subcarriers at the edge of the bandwidth may not be included in a group 310. In some embodiments only subcarriers that are used to encode a symbol of the L-SIG 306 are included in a group 310.

In some embodiments the subcarriers of the groups 310 are evenly intermixed with each other. For example, the subcarriers are divided into N groups 310 for sending N bits piggybacked on the R-L-SIG.

For example for N=the number of groups, and M=number of subcarriers to use, then the n-th group may take subcarriers n, N+n, 2N+n, . . . , (M/N−1)*n+n. For example, for M=48, N=4, and n=3, the 3rd group may take subcarriers 3, 7, 11, 15, 19, 23, 27, 31, 35, 39, 43, and 47, with the subcarriers are number 1 through M. Spreading the subcarriers across the sub-channel may increase frequency diversity and increase the reliability. Other partitions of the subcarriers into the groups 310 may be used. For example, some of the subcarriers of a group may be contiguous.

If the transmitted symbol sequence on subcarrier group n 310.$n$ is represented as $s\_(1,n)$, $s\_(2,n)$, $s\_(3,n)$, . . . , $s\_(M/N,n)$ in the L-SIG 306 field, where n is the n-th group 310.$n$. In the BPSK of group n 312.$n$ of the R-L-SIG 308 field, the transmitted symbol sequence on subcarrier group n may be $s\_(1,n)$, $s\_(2,n)$, $s\_(3,n)$, . . . , $s\_(M/N,n)$ for a bit value of zero for the nth group, and $-s\_(1,n)$, $-s\_(2,n)$, $-s\_(3,n)$, . . . , $-s\_(M/N,n)$ for a bit value of one for the nth group. In this way a bit may be encoded on each of the BPSKs of group N 312.N of the R-L-SIG 308 field. In some embodiments encoding a bit with a group N 312.N may be termed piggybacking the bit with group N 312.N.

In this way, each subcarrier group 310 sends one piggybacked bit independently. Besides uncoded BPSK, the piggybacked bits may be encoded by a channel encoder and the code bits may be used to modulate the symbol sequence of the L-SIG 306 field using modulation other than BPSK.

In some embodiments M can be 48, 52, and 56 for each 20 MHz channel. For M=48, only the data subcarriers of 802.11a may be assigned to the groups and the 4 pilot subcarriers are not assigned to the groups. For M=52, the 4 pilot subcarriers of 802.11a may be assigned to the groups. Also for M=52, only the data subcarriers of 802.11n/ac may be assigned to the groups and the 4 pilot subcarriers are not assigned to the groups. For M=56, all subcarriers of 802.11n/ac including the 4 pilot subcarriers of 802.11n/ac may be assigned to the groups.

The OFDM symbol of the L-SIG 306 field may be used as the reference for the R-L-SIG 308. For increasing the number of usable subcarriers for the subsequent OFDM symbols, 4 subcarriers may be added to the OFDM symbol of the L-SIG 306 field that is sent in IEEE 802.11a format with 56 subcarriers including 4 pilot subcarriers. The 4 additional subcarriers may be added to the 20 MHz band edges as in IEEE 802.11n/ac. Training signals known by the receiver may be sent on the 4 added subcarriers for channel training of the 4 additional subcarriers. The channel training signals for the 4 additional subcarriers may be sent after the symbol for the L-SIG 306 field, since the additional training signal slightly reduces the transmission power carrying the code bits of the L-SIG 306 field.

If the additional training signals are sent in the L-SIG 306 field, then 4 additional subcarriers may also be partitioned into the groups 310. Otherwise, the additional subcarriers may not be assigned to subcarrier groups or the additional training signals may be sent in the OFDM symbol of the R-L-SIG 308 field or a latter OFDM symbol.

The piggybacked bits are more reliable (see FIG. 5) and the detection latency is small, so critical and low-latency information may be carried by the piggybacked bits. For example, the piggybacked bits can indicate one or more of HE-SIG-A repetition, the cyclic prefix duration of the HE-SIG-A symbol, the number of HE-SIG-A symbols, and a subsequent or future version of IEEE 802.11.

Figure 4:
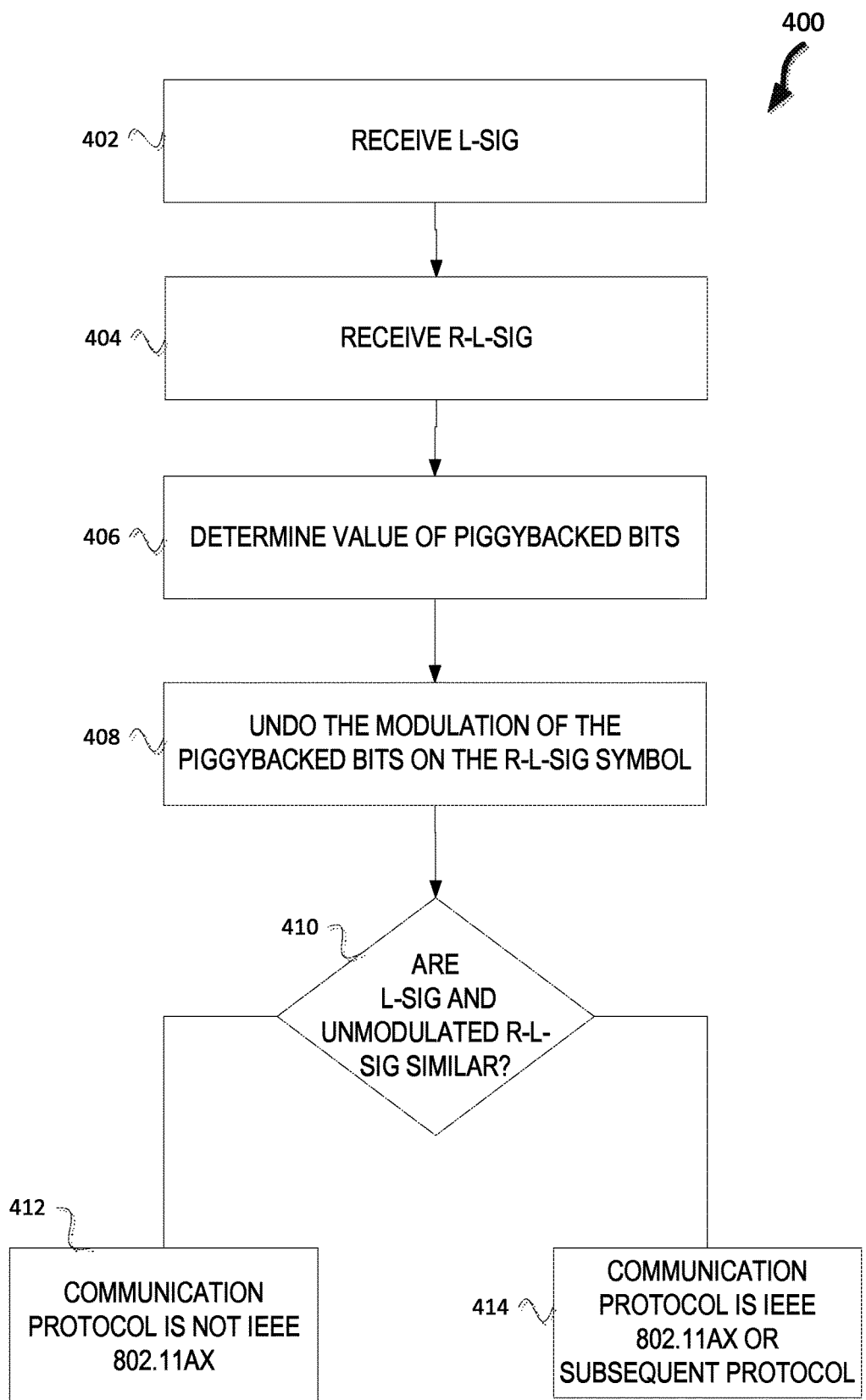
FIG. 4 illustrates a method for detecting a communication protocol in accordance with some embodiments.

FIG. 4 illustrates a method for detecting a communication protocol in accordance with some embodiments. The method 400 begins at operation 402 with receive L-SIG. For example, a HEW station 104 or master station 102 may receive a L-SIG 306 field as illustrated in FIG. 3. The method 400 continues at operation 404 with receive R-L-SIG. For example, a HEW station 104 or master station 102 may receive an R-L-SIG 308 field. The method 400 continues at operation 406 with determine value of piggybacked bits. For example, the HEW station 104 or master station 102 may determine that a bit value of 1 is indicated by group 2 310.2 subcarriers if the polarization of the subcarriers of BPSK of group 2 312.2 have been flipped in comparison to the group 2 310.2 subcarriers. In some embodiments, the HEW station 104 or master station 102 may compute the inner products between the group n 310.$n$ of the L-SIG 306 field and the corresponding BPSK of group n 312.$n$ of the R-L-SIG 308 field for determining whether or not the subcarriers have been flipped.

The method 400 continues at operation 408 with undo the modulation of the piggybacked bits on the R-L-SIG symbol. For example, the HEW station 104 or master station 102 may un-flip or re-flip each of the subcarriers in BPSK of group 2 312.2.

The method 400 continues at operation 410 with are L-SIG and unmodulated R-L-SIG similar. For example, a HEW station 104 or master station 102 may compare the subcarriers or symbols of the unmodulated R-L-SIG with the subcarriers or symbols of the L-SIG and based on the comparison determine whether or not they are similar.

The method 400 continues at operation 414, if the unmodulated R-L-SIG and the L-SIG are similar, with communication protocol is IEEE 802.11ax or subsequent protocol. For example, the HEW station 104 or master station 102 may determine that the packet is an IEEE 802.11ax packet. The information that was piggybacked on the R-L-SIG may provide additional information regarding how to receive the remainder of the IEEE 802.11ax, which may make the reception of the IEEE 802.11ax packet more efficient. In some embodiments, the information that was piggybacked on the R-L-SIG may indicate that the packet is not IEEE 802.11ax but a subsequent communication protocol. One or more of the bits that are piggybacked on the R-L-SIG may be reserved to indicate a future communication protocol.

The method 400 continues at operation 412, if the unmodulated R-L-SIG and the L-SIG are not similar, with communication protocol is not IEEE 802.11ax. For example, the HEW station 106 or master station 102 may determine that the communication protocol is not IEEE 802.11ax, but rather IEEE 802.11a. The method 400 may end.

Figure 5:
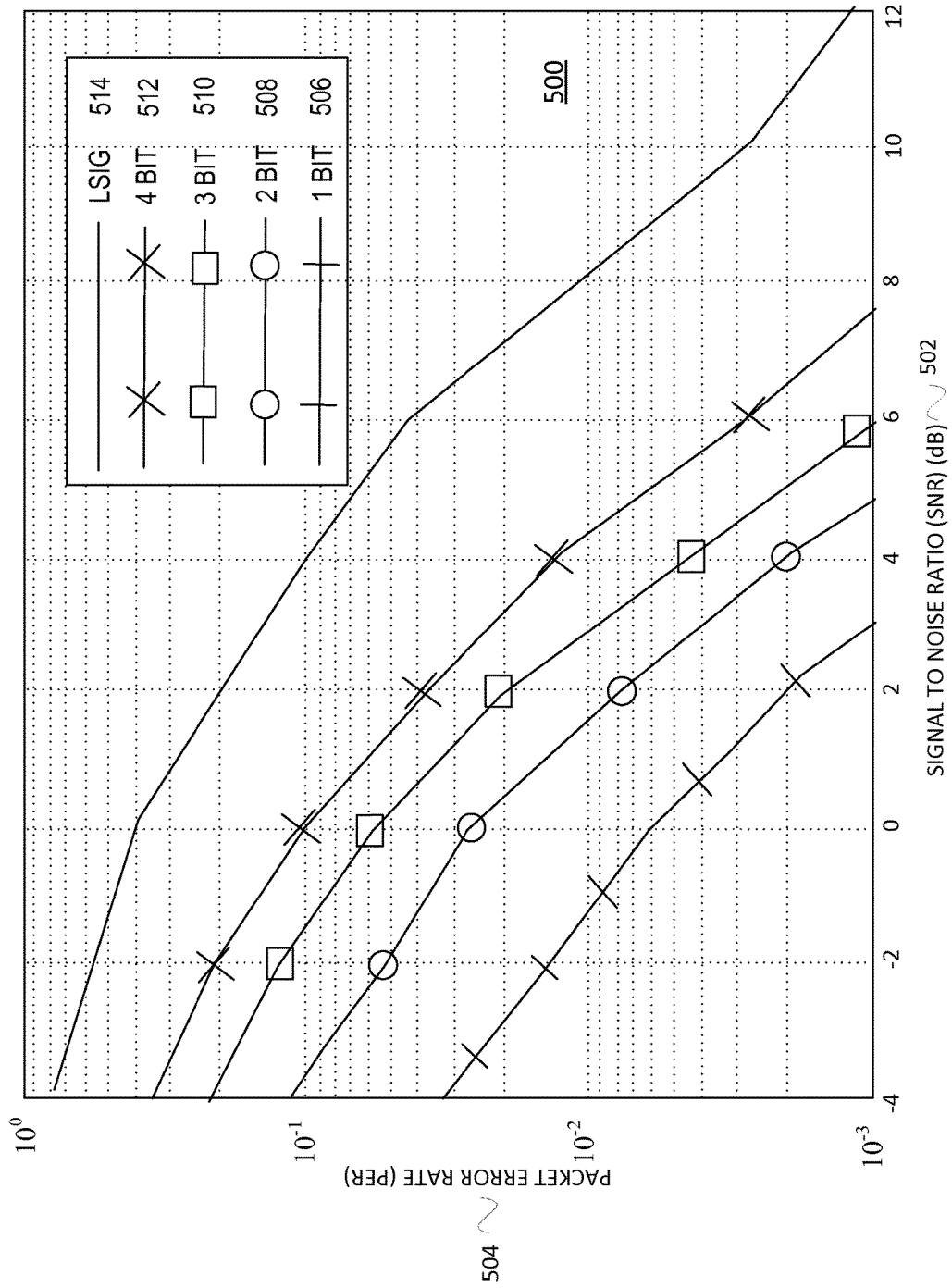
FIG. 5 illustrates packet error rates for a simulation according to example embodiments.

FIG. 5 illustrates packet error rates for a simulation according to example embodiments. Illustrated in FIG. 5 is a graph 500 with signal to noise ratio (SNR) in decibels (dB) along a horizontal axis, packet error rate (PER) 504 along a vertical axis, R-L-SIG with one bit piggybacked 506, R-L-SIG with two bits piggybacked 508, R-L-SIG with three bits piggybacked 510, R-L-SIG with four bits piggybacked 512, and L-SIG 514.

The channel used for the simulation is an IEEE 802.11n channel model D with non-line of sight setting. Both the transmitter and the receiver have one antenna, respectively. The L-SIG 514 is the baseline that is the PER of the L-SIG symbol with 18 bit payload excluding the tail bits.

The other curves are for the BPSK modulation with R-L-SIG with one bit piggybacked 506, R-L-SIG with two bits piggybacked 508, R-L-SIG with three bits piggybacked 510, and R-L-SIG with four bits piggybacked. FIG. 5 illustrates that example embodiments of R-L-SIG that encode piggybacked bits have a better performance than the L-SIG 514, i.e. a fraction of the L-SIG 514 PER. Since L-SIG is the bottle neck of the system, the HEW station 104 or master station 102 does not need to make the piggybacked bits of the R-L-SIG much more reliable than the L-SIG. Therefore, it may be more efficient to piggyback one, two, three, or four bits on the R-L-SIG field.

The free distance of L-SIG 306 field code word may be 10, which may be determined by the IEEE 802.11a/n/ac convolutional code. The minimum distance between the additional 1-4 bits is 13-24. Therefore, the reliability of the additional bits is better than the reliability of the L-SIG 306 field. Since the L-SIG 306 field may be a bottle neck, the additional bits may not be needed to be much more reliable than the L-SIG 306 field.

In example embodiments, the protocol version of IEEE 802.11ax may be reliably signaled using the same amount of time as the L-SIG such as 4 μs and additional 4 bits of information may be provided.

Figure 6:
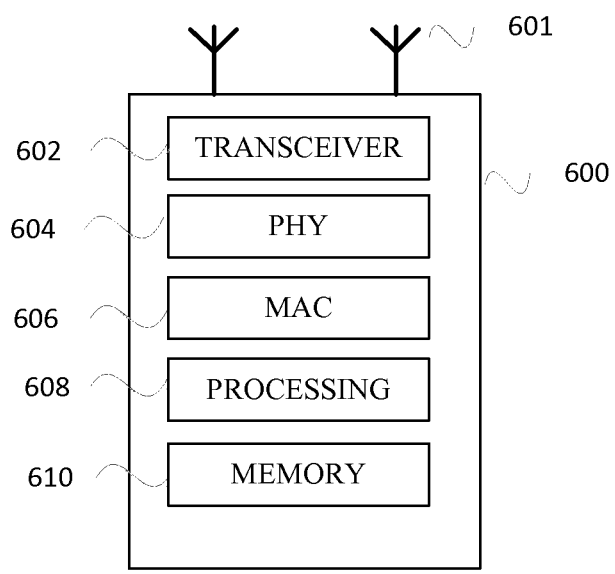
FIG. 6 illustrates a high-efficiency wireless (HEW) device in accordance with some embodiments.

FIG. 6 illustrates a HEW device in accordance with some embodiments. HEW device 600 may be an HEW compliant device that may be arranged to communicate with one or more other HEW devices, such as HEW STAs 104 (FIG. 1) or master station 102 (FIG. 1) as well as communicate with legacy devices 106 (FIG. 1). HEW STAs 104 and legacy devices 106 may also be referred to as HEW devices and legacy STAs, respectively. HEW device 600 may be suitable for operating as master station 102 (FIG. 1) or a HEW STA 104 (FIG. 1). In accordance with embodiments, HEW device 600 may include, among other things, a transmit/receive element 601 (for example an antenna), a transceiver 602, physical (PHY) circuitry 604, and media access control (MAC) circuitry 606. PHY circuitry 604 and MAC circuitry 606 may be HEW compliant layers and may also be compliant with one or more legacy IEEE 802.11 standards. MAC circuitry 606 may be arranged to configure packets such as a physical layer convergence procedure (PLCP) protocol data unit (PPDUs) and arranged to transmit and receive PPDUs, among other things. HEW device 600 may also include circuitry 608 and memory 610 configured to perform the various operations described herein. The circuitry 608 may be coupled to the transceiver 602, which may be coupled to the transmit/receive element 601. While FIG. 6 depicts the circuitry 608 and the transceiver 602 as separate components, the circuitry 608 and the transceiver 602 may be integrated together in an electronic package or chip.

In some embodiments, the MAC circuitry 606 may be arranged to contend for a wireless medium during a contention period to receive control of the medium for the HEW control period and configure an HEW PPDU. In some embodiments, the MAC circuitry 606 may be arranged to contend for the wireless medium based on channel contention settings, a transmitting power level, and a clear channel assessment (CCA) level.

The PHY circuitry 604 may be arranged to transmit the HEW PPDU. The PHY circuitry 604 may include circuitry for modulation/demodulation, upconversion/downconversion, filtering, amplification, etc. In some embodiments, the circuitry 608 may include one or more processors. The circuitry 608 may be configured to perform functions based on instructions being stored in a RAM or ROM, or based on special purpose circuitry. The circuitry 608 may be termed processing circuitry in accordance with some embodiments. The circuitry 608 may include a processor such as a general purpose processor or special purpose processor. The circuitry 608 may implement one or more functions associated with transmit/receive elements 601, the transceiver 602, the PHY circuitry 604, the MAC circuitry 606, and/or the memory 610.

In some embodiments, the circuitry 608 may be configured to perform one or more of the functions and/or methods described herein and/or in conjunction with FIGS. 1-6 such as generating, transmitting, receiving, interpreting, and operating in accordance with frames that indicate the protocol of the frame using an R-L-SIG field and which may also indicate additional information.

In some embodiments, the transmit/receive elements 601 may be two or more antennas that may be coupled to the PHY circuitry 604 and arranged for sending and receiving signals including transmission of the HEW packets. The transceiver 602 may transmit and receive data such as HEW PPDU and packets that include an indication that the HEW device 600 should adapt the channel contention settings according to settings included in the packet. The memory 610 may store information for configuring the other circuitry to perform operations for configuring and transmitting HEW packets and performing the various operations to perform one or more of the functions and/or methods described herein and/or in conjunction with FIGS. 1-6 such as generating, transmitting, receiving, interpreting, and operating in accordance with frames that indicate the protocol of the frame using an R-L-SIG field and which may also indicate additional information.

In some embodiments, the HEW device 600 may be configured to communicate using OFDM communication signals over a multicarrier communication channel. In some embodiments, HEW device 600 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, or other standards as described in conjunction with FIG. 1, although the scope of the invention is not limited in this respect as they may also be suitable to transmit and/or receive communications in accordance with other techniques and standards. In some embodiments, the HEW device 600 may use 4× symbol duration of 802.11n or 802.11ac.

In some embodiments, an HEW device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 601 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the HEW device 600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The following examples pertain to further embodiments. Example 1 is an apparatus of a high-efficiency wireless local area network (HEW) device, including circuitry configured to: generate a HEW packet comprising a legacy signal (L-SIG) field and an R-L-SIG field, where the L-SIG field comprises a plurality of subcarriers and the R-L-SIG field comprises a repeat of the plurality of subcarriers partitioned into a plurality of groups, and where information is encoded into one or more groups of the plurality of groups by a same modulation to each subcarrier partitioned into the corresponding group of the one or more groups; and transmit the HEW packet.

In Example 2, the subject matter of Example 1 can optionally include where the same modulation is to flip the polarity of each subcarrier.

In Example 3, the subject matter of Examples 1 and 2 can optionally include where one bit of information is encoded by each of the one or more groups.

In Example 4, the subject matter of any of Examples 1-4 can optionally include where the subcarriers are to be partitioned into 2 to 4 groups each with 24 to 13 subcarriers, and where each group carries one bit of information using binary phase-shift keying (BPSK) by flipping a polarization of each subcarrier of the plurality of subcarriers partitioned into the corresponding group.

In Example 5, the subject matter of any of Examples 1-4 can optionally include where the HEW packet is transmitted on a 20 mega Hertz (MHz) sub-channel.

In Example 6, the subject matter of any of Examples 1-5 can optionally include where only data subcarriers of the plurality of subcarriers are partitioned into the plurality of groups and pilot subcarriers of the plurality of subcarriers are not partitioned into the plurality of groups.

In Example 7, the subject matter of any of Examples 1-6 can optionally include where the circuitry is further configured to partition the plurality of subcarriers into the plurality of groups with the nth group of the plurality of groups being every M/N subcarrier of the plurality of subcarriers, wherein M is a number of the plurality of subcarriers and N is a number of the plurality of groups.

In Example 8, the subject matter of Example 7 can optionally include where the number of subcarriers is one from the following group: 48, 52, and 56 for each 20 mega Hertz (MHz) channel the HEW packet is transmitted on.

In Example 9, the subject matter of Example 8 can optionally include where for the number of subcarriers being 48 only data subcarriers of Institute of Electrical and Electronic Engineers (IEEE) 802.11a are partitioned into the plurality of groups and 4 pilot subcarriers are not partitioned into the plurality of groups, and where for the number of subcarriers being 52 and for IEEE 802.11a four pilot subcarriers are partitioned into the plurality or groups, where for the number of subcarriers being 52 and for IEEE 802.11n/ac only data carriers are partitioned into the plurality of groups, and where for the number of subcarriers being 56 all subcarriers of IEEE 802.11n/ac that includes 4 pilot subcarriers are partitioned into the plurality of groups.

In Example 10, the subject matter of any of Examples 1-9 can optionally include where the plurality of subcarriers comprises 52 subcarriers in accordance with Institute of Electrical and Electronic Engineers (IEEE) 802.11a and 4 subcarriers added from edges of a 20 mega Hertz (MHz) sub-channel.

In Example 11, the subject matter of any of Examples 1-10 can optionally include where the circuitry is further configured to: transmit four additional subcarriers added from edges of a 20 mega Hertz (MHz) sub-channel as training signals for a receiver.

In Example 12, the subject matter of any of Examples 1-11 can optionally include where the HEW device is one from the following group: an Institute of Electrical and Electronic Engineers (IEEE) 802.11ax access point and an IEEE 802.11ax station.

In Example 13, the subject matter of any of Examples 1-12 can optionally include where the circuitry further comprises processing circuitry and transceiver circuitry.

In Example 14, the subject matter of Example 13 can optionally include memory coupled to the circuitry; and, one or more antennas coupled to the circuitry.

Example 15 is a method performed by a high-efficiency (HE) wireless local area network (WLAN) (HEW) device. The method including generating a HEW packet comprising a legacy signal (L-SIG) field and an R-L-SIG field, where the L-SIG field comprises a plurality of subcarriers and the R-L-SIG field comprises a repeat of the plurality of subcarriers partitioned into a plurality of groups, and where information is encoded into one or more groups of the plurality of groups by a same modulation to each subcarrier partitioned into the corresponding group of the one or more groups; and transmitting the HEW packet.

In Example 16, the subject matter of Example 15 can optionally include where the subcarriers are to be partitioned into 2 to 4 groups each with 24 to 13 subcarriers, and where each group carries one bit of information using binary phase-shift keying (BPSK) by flipping a polarization of each subcarrier of the plurality of subcarriers partitioned into the corresponding group.

In Example 17, the subject matter of Examples 15 and 16 can optionally include partitioning the plurality of subcarriers into the plurality of groups with the nth group of the plurality of groups being every M/N subcarrier of the plurality of subcarriers, where M is a number of the plurality of subcarriers and N is a number of the plurality of groups.

Example 18 is an apparatus of a high-efficiency wireless local area network (HEW) device including circuitry configured to: receive a legacy signal (L-SIG) field; receive a repeat L-SIG (R-L-SIG) field; and determine whether the R-L-SIG field is a repeat of the L-SIG field, where the L-SIG field comprises a plurality of subcarriers, and where the R-L-SIG field comprises a repeat of the plurality of subcarriers partitioned into a plurality of groups, and where information is encoded into one or more groups of the plurality of groups by a same modulation to each subcarrier partitioned into the corresponding group of the one or more groups.

In Example 19, the subject matter of Example 18 can optionally include where the circuitry is further configured to: determine the information encoded into the one or more groups; undo the modulation to each subcarrier partitioned into the corresponding group; and if the L-SIG field and the R-L-SIG field indicate the R-L-SIG field is a repeated L-SIG field, then determine that a communication protocol is Institute for Electrical and Electronic Engineers (IEEE) 802.11ax or a subsequent protocol if the information indicates a subsequent protocol.

In Example 20, the subject matter of Examples 18 or 19 can optionally include where the same modulation is to flip the polarity of each subcarrier.

In Example 21, the subject matter of any of Examples 18-20 can optionally include where one bit of information is encoded by each of the one or more groups.

In Example 22, the subject matter of any of Examples 18-21 can optionally include where the subcarriers are partitioned into 2 to 4 groups each with 24 to 13 subcarriers, and where each group carries one bit of information using binary phase-shift keying (BPSK) by flipping a polarization of each subcarrier of the plurality of subcarriers partitioned into the corresponding group.

In Example 23, the subject matter of any of Examples 18-23 can optionally include memory coupled to the circuitry; and one or more antennas coupled to the circuitry.

Example 24 is a non-transitory computer-readable storage medium that stores instructions for execution by one or more processors of a high-efficiency wireless local-area network (WLAN) (HEW) station. The operations configure the one or more processors to cause the HEW master station to: generate a HEW packet comprising a legacy signal (L-SIG) field and an R-L-SIG field, where the L-SIG field comprises a plurality of subcarriers and the R-L-SIG field comprises a repeat of the plurality of subcarriers partitioned into a plurality of groups, and where information is encoded into one or more groups of the plurality of groups by a same modulation to each subcarrier partitioned into the corresponding group of the one or more groups; and transmit the HEW packet.

In Example 25, the subject matter of Example 24 can optionally include where the subcarriers are to be partitioned into 2 to 4 groups each with 24 to 13 subcarriers, and where each group carries one bit of information using binary phase-shift keying (BPSK) by flipping a polarization of each subcarrier of the plurality of subcarriers partitioned into the corresponding group.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) wireless device, the apparatus comprising: memory; and, circuitry coupled to the memory, the circuitry configured to:
   generate a HE packet comprising a legacy signal (L-SIG) field and an R-L-SIG field, wherein the L-SIG field comprises a plurality of subcarriers and the R-L-SIG field comprises a repeat of the plurality of subcarriers, wherein a plurality of subcarriers of the R-L-SIG field are partitioned into a plurality of groups, wherein information is encoded into one or more groups of the plurality of groups by a same modulation to each subcarrier of a group of the one or more groups, and wherein if the R-L-SIG field is a repeated L-SIG field, the HE packet is generated in accordance with a communication protocol of Institute for Electrical and Electronic Engineers (IEEE) 802.11ax or generated in accordance with a subsequent protocol if the information indicates a subsequent protocol; and
   configure the wireless device to transmit the HE wireless packet.

2. The apparatus of the HE wireless device of claim 1, wherein the same modulation is to flip the polarity of each subcarrier.

3. The apparatus of the HE wireless device of claim 1, wherein one bit of information is encoded by each of the one or more groups.

4. The apparatus of the HE wireless device of claim 1, wherein the subcarriers are to be partitioned into 2 to 4 groups each with 24 to 13 subcarriers, and wherein each group carries one bit of information using binary phase-shift keying (BPSK) by flipping a polarization of each subcarrier of the plurality of subcarriers partitioned into the corresponding group.

5. The apparatus of the HE wireless device of claim 1, wherein the HE packet is transmitted on a 20 mega Hertz (MHz) sub-channel.

6. The apparatus of the HE wireless device of claim 1, wherein only data subcarriers of the plurality of subcarriers are partitioned into the plurality of groups and pilot subcarriers of the plurality of subcarriers are not partitioned into the plurality of groups.

7. The apparatus of the HE wireless device of claim 1, wherein the circuitry is further configured to partition the plurality of subcarriers into the plurality of groups with the nth group of the plurality of groups being every M/N subcarrier of the plurality of subcarriers, wherein M is a number of the plurality of subcarriers and N is a number of the plurality of groups.

8. The apparatus of the HE wireless device of claim 7, wherein the number of subcarriers is one from the following group: 48, 52, and 56 for each 20 mega Hertz (MHz) channel the HEW packet is transmitted on.

9. The apparatus of the HE wireless device of claim 8, wherein for the number of subcarriers being 48 only data subcarriers of IEEE 802.11a are partitioned into the plurality of groups and 4 pilot subcarriers are not partitioned into the plurality of groups, and wherein for the number of subcarriers being 52 and for IEEE 802.11a four pilot subcarriers are partitioned into the plurality of groups, wherein for the number of subcarriers being 52 and for IEEE 802.11n/ac only data carriers are partitioned into the plurality of groups, and wherein for the number of subcarriers being 56 all subcarriers of IEEE 802.11n/ac that includes 4 pilot subcarriers are partitioned into the plurality of groups.

10. The apparatus of the HE wireless device of claim 1, wherein the plurality of subcarriers comprises 52 subcarriers in accordance with IEEE 802.11a and 4 subcarriers added from edges of a 20 mega Hertz (MHz) sub-channel.

11. The apparatus of the HE wireless device of claim 1, wherein the circuitry is further configured to:
   configure the he wireless device to transmit four additional subcarriers added from edges of a 20 mega Hertz (MHz) sub-channel as training signals for a receiver.

12. The apparatus of the HE wireless device of claim 1, wherein the HE device is one from the following group: an IEEE 802.11ax access point and an IEEE 802.11ax station.

13. The apparatus of the HE wireless device of claim 1, wherein the circuitry further comprises processing circuitry and transceiver circuitry.

14. The apparatus of the HE wireless device of claim 13, further comprising transceiver circuitry coupled to the memory; and, one or more antennas coupled to the transceiver circuitry.

15. A method performed by a high-efficiency (HE) wireless device, the method comprising:
generating a HE packet comprising a legacy signal (L-SIG) field and an R-L-SIG field, wherein the L-SIG field comprises a plurality of subcarriers and the R-L-SIG field comprises a repeat of the plurality of subcarriers partitioned into a plurality of groups, and wherein information is encoded into one or more groups of the plurality of groups by a same modulation to each subcarrier partitioned into the corresponding group of the one or more groups, wherein if the R-L-SIG field is a repeated L-SIG field, the HE packet is generated in accordance with a communication protocol of Institute for Electrical and Electronic Engineers (IEEE) 802.11ax or a subsequent protocol if the information indicates a subsequent protocol; and
configuring the HE wireless device to transmit the HE packet.

16. The method of claim 15, wherein the subcarriers are to be partitioned into 2 to 4 groups each with 24 to 13 subcarriers, and wherein each group carries one bit of information using binary phase-shift keying (BPSK) by flipping a polarization of each subcarrier of the plurality of subcarriers partitioned into the corresponding group.

17. The method of claim 15, further comprising:
partitioning the plurality of subcarriers into the plurality of groups with the nth group of the plurality of groups being every M/N subcarrier of the plurality of subcarriers, wherein M is a number of the plurality of subcarriers and N is a number of the plurality of groups.

18. An apparatus of a high-efficiency (HE) wireless device, the apparatus comprising: memory, and circuitry coupled to the memory, the circuitry configured to:
decode a legacy signal (L-SIG) field of a packet;
decode a repeat L-SIG (R-L-SIG) field of the packet;
determine whether the R-L-SIG field is a repeat of the L-SIG field, wherein the L-SIG field comprises a plurality of subcarriers, wherein the R-L-SIG field comprises a repeat of the plurality of subcarriers of the L-SIG field, wherein a plurality of subcarriers of the R-L-SIG field are partitioned into a plurality of groups, and wherein information is encoded into a group of the one or more groups of the plurality of groups by a same modulation to each subcarrier of the group of the one or more groups;
determine the information encoded into the one or more groups;
undo the same modulation of each subcarrier of each group of the one or more groups; and
if the L-SIG field and the R-L-SIG field indicate the R-L-SIG field is a repeated L-SIG field, decode a remaining portion of the packet in accordance with Institute for Electrical and Electronic Engineers (IEEE) 802.11ax or a subsequent protocol if the information indicates a subsequent protocol.

19. The apparatus of the HE wireless device of claim 18, wherein the same modulation is to flip the polarity of each subcarrier.

20. The apparatus of the HE wireless device of claim 18, wherein one bit of information is encoded by each of the one or more groups.

21. The apparatus of the HE wireless device of claim 18, wherein the subcarriers are partitioned into 2 to 4 groups each with 24 to 13 subcarriers, and wherein each group carries one bit of information using binary phase-shift keying (BPSK) by flipping a polarization of each subcarrier of the plurality of subcarriers partitioned into the corresponding group.

22. The apparatus of the HE wireless device of claim 18, further comprising transceiver circuitry coupled to the memory; and one or more antennas coupled to the transceiver circuitry.

23. A non-transitory computer-readable storage medium that stores instructions for execution by one or more processors of a high-efficiency (HE) wireless station, the operations to configure the one or more processors to cause the HEW master station to:
generate a HE packet comprising a legacy signal (L-SIG) field and an R-L-SIG field, wherein the L-SIG field comprises a plurality of subcarriers and the R-L-SIG field comprises a repeat of the plurality of subcarriers partitioned into a plurality of groups, and wherein information is encoded into one or more groups of the plurality of groups by a same modulation to each subcarrier partitioned into the corresponding group of the one or more groups, wherein if the R-L-SIG field is a repeated L-SIG field, the HE packet is generated in accordance with a communication protocol of Institute for Electrical and Electronic Engineers (IEEE) 802.11ax or a subsequent protocol if the information indicates a subsequent protocol; and
configure the wireless device to transmit the HE packet.

24. The non-transitory computer-readable storage medium of claim 23, wherein the subcarriers are to be partitioned into 2 to 4 groups each with 24 to 13 subcarriers, and wherein each group carries one bit of information using binary phase-shift keying (BPSK) by flipping a polarization of each subcarrier of the plurality of subcarriers partitioned into the corresponding group.

25. The apparatus of the wireless device of claim 1, wherein the memory is configured to store the HE packet.

* * * * *